Sept. 20, 1955 H. F. ELLIOTT 2,718,150
PRECISION POSITIONING APPARATUS
Filed Oct. 14, 1952 5 Sheets-Sheet 1

*INVENTOR.*
HAROLD F. ELLIOTT
BY Lawrence B. Dodds
ATTORNEY

INVENTOR.
HAROLD F. ELLIOTT
BY Laurence B. Dodds
ATTORNEY

Sept. 20, 1955           H. F. ELLIOTT           2,718,150

PRECISION POSITIONING APPARATUS

Filed Oct. 14, 1952           5 Sheets–Sheet 3

*INVENTOR.*
HAROLD F. ELLIOTT
BY *Laurence B. Dodds*
ATTORNEY

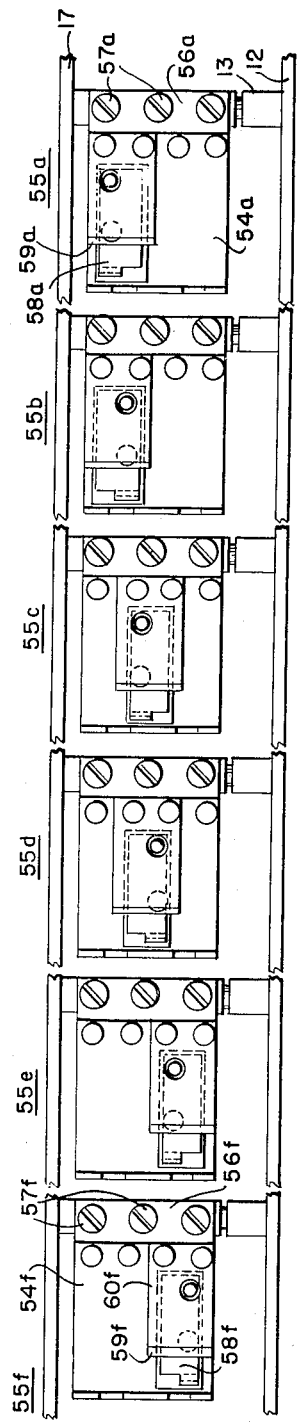
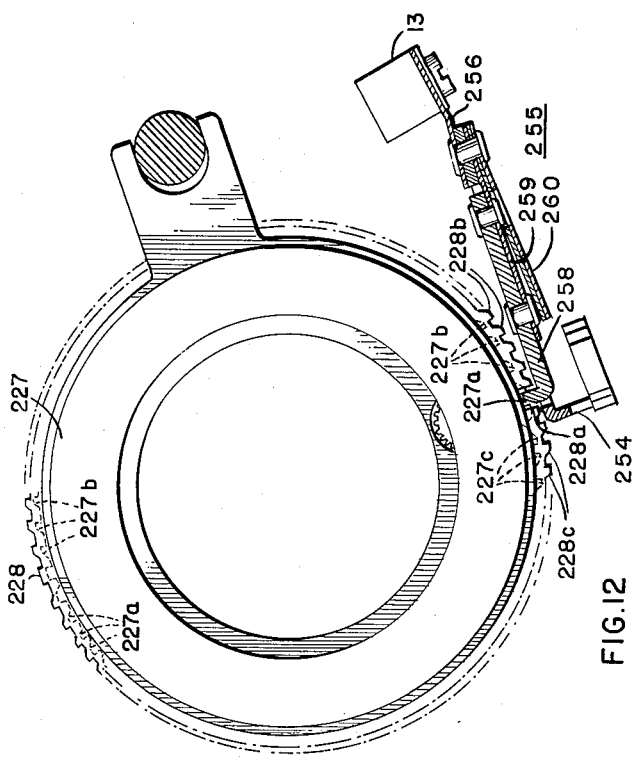

Sept. 20, 1955     H. F. ELLIOTT     2,718,150
PRECISION POSITIONING APPARATUS

Filed Oct. 14, 1952     5 Sheets—Sheet 5

INVENTOR.
HAROLD F. ELLIOTT
BY *Laurence B. Dodds*
ATTORNEY

United States Patent Office 2,718,150
Patented Sept. 20, 1955

2,718,150

PRECISION POSITIONING APPARATUS

Harold F. Elliott, Palo Alto, Calif.

Application October 14, 1952, Serial No. 314,687

12 Claims. (Cl. 74—10.2)

This invention relates to precision positioning apparatus and, while it is of general application, it is particularly adapted to the manual positioning of a rotatable tuning element of a portable radio-communication apparatus.

Heretofore there have been devised various manually operable and remotely controllable positioning apparatuses for the tuning elements of radio-communication apparatus. The majority of such positioning apparatuses have been relatively complex, bulky, of relatively low precision for usual manufacturing tolerances, or subject to a combination of these limitations. In certain portable radio-communication apparatus, for example, portable military transceivers, there has been a demand for a manually operable positioning apparatus for the tuning element of the transceiver which is light in weight, has a minimum number of easily fabricated parts, is low in cost, and has a high-precision performance from parts of usual production tolerances. More particularly, there has been a demand for such a manually operable positioning apparatus which could be operated by touch and with precision when darkness, cold, rain, or confusion might preclude successful operation by the ordinary visual tuning methods. It has also been desired that such an apparatus should be capable of tuning the communication apparatus to any desired number of channels with positive locking of the apparatus on each channel. The present invention relates to such manually operable positioning apparatus of the type sometimes referred to as a detent tuner.

It is an object of the present invention, therefore, to provide a new and improved precision positioning apparatus having one or more of the desirable characteristics described above.

In accordance with the invention, an apparatus for selectively and precisely positioning a driven element in any of n predetermined angular positions comprises a shaft for connection to the driven element, means for actuating the shaft, n circular discs axially disposed along the shaft, each having a detent, and releasable means for individually securing the discs to the shaft in positions related to such predetermined positions. The positioning apparatus also includes n selectively operable latches individually co-operating with the discs and arranged in an arc about the shaft and axially movable with respect thereto for individually setting any one of the latches for engagement with a corresponding one of the disc detents upon operation of the actuating means to arrest the driven element in a corresponding one of such predetermined positions. The term "detent" as used herein and in the appended claims refers to either a concave or convex peripheral discontinuity and the term "latch" refers to any element having a configuration complementary to that of the detent. The term "disc" is used to refer to a circular plate-like element which may be either solid or annular in configuration.

Further in accordance with the invention, an apparatus for selectively and precisely positioning a driven element in any of n predetermined angular positions comprises a shaft for connection to the driven element, means for actuating the shaft, n circular discs axially disposed along the shaft, each having a detent, and releasable means for individually securing the discs to the shaft in positions related to such predetermined positions. The positioning apparatus also includes n selectively operable latches individually co-operating with the discs and arranged in overlapping relation in an arc about the shaft and substantially tangential to the discs, each engageable with the detent of its associated disc to arrest the shaft but normally out of contact with the disc, and n selectively operable devices movable axially with respect to the shaft for individually setting any one of the latches for engagement with a corresponding one of the disc detents upon operation of the actuating means to arrest the driven element in a corresponding one of such predetermined positions.

For a better understanding of the present invention, together with other and further objects thereof, reference is had to the following description taken in connection with the accompanying drawings, while its scope will be pointed out in the appended claims.

Fig. 1 of the drawings is a front elevation of a precision positioning apparatus constructed in accordance with the invention;

Figures 1, 4:
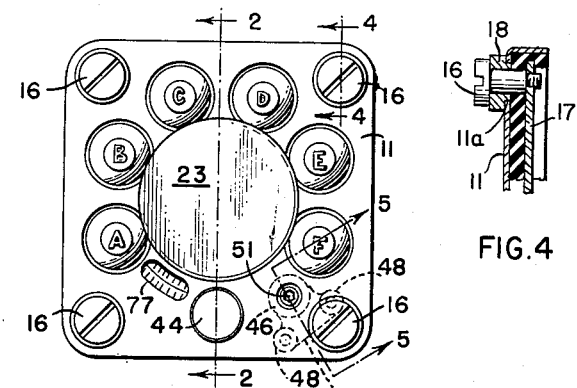
Figure 5:
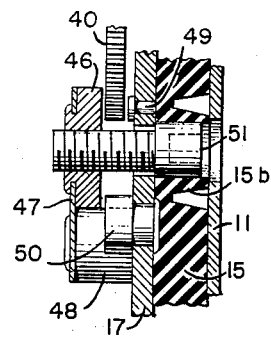
Figure 7:
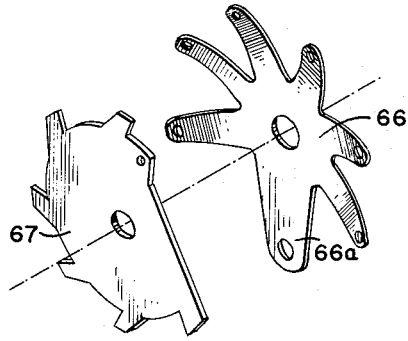
Figure 6:
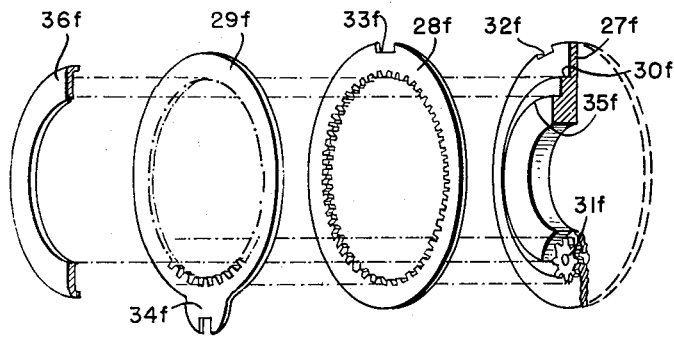
Figure 8:
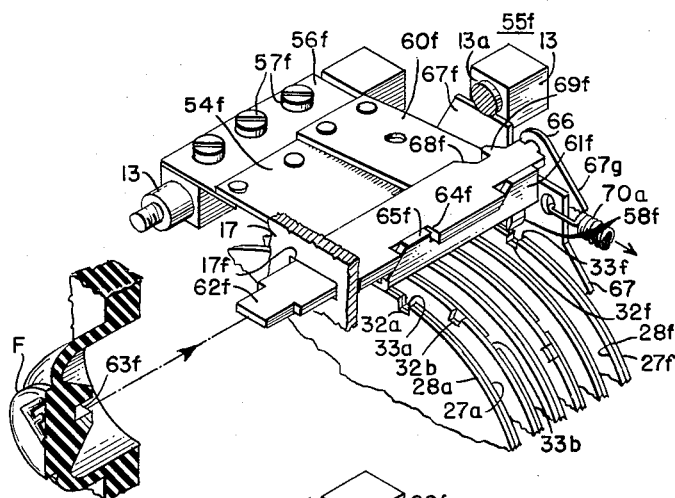
Figure 9:
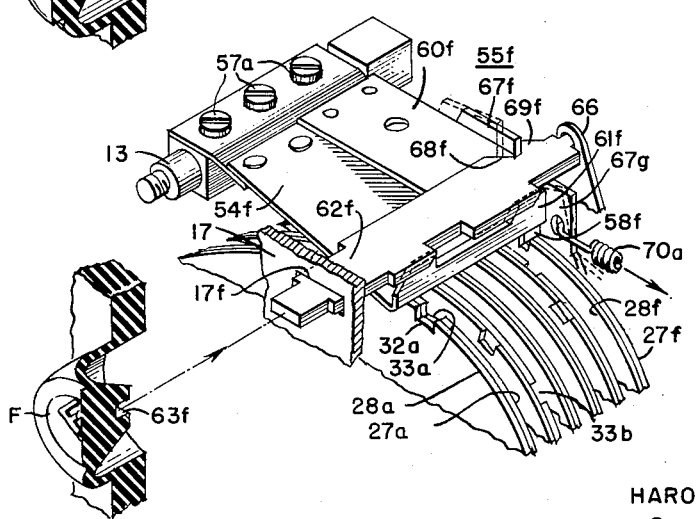
Figure 11:
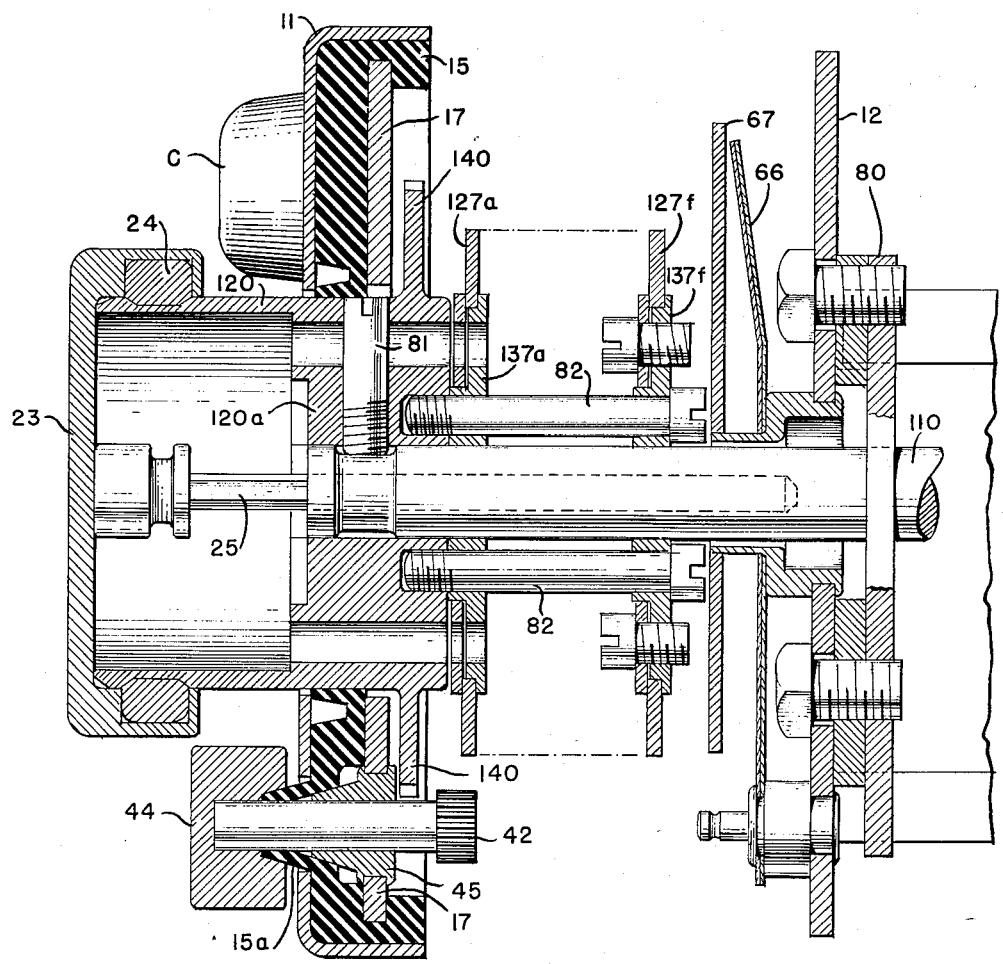

Figs. 4 and 5 are fragmentary cross-sectional detail views of portions of the apparatus of Fig. 1 along the lines 4—4 and 5—5, respectively;

Fig. 6 is an exploded perspective view of a planetary gear reduction incorporated in the apparatus of Fig. 1;

Fig. 7 is a perspective view of a spider biasing spring of the apparatus of Fig. 1;

Figs. 8 and 9 are perspective detail views of one of the manually operable elements of the apparatus of Fig. 1 in released position and latched position, respectively;

Fig. 10 is a developed layout of the latching elements of the apparatus of Fig. 1;

Fig. 11 is a longitudinal sectional view of a modified form of the invention of the single-revolution type and supported directly from the shaft of the tuning element being positioned; while Fig. 12 is a view in elevation of a modified form of detent assembly for use in the apparatus of Fig. 1.

Figure 2:
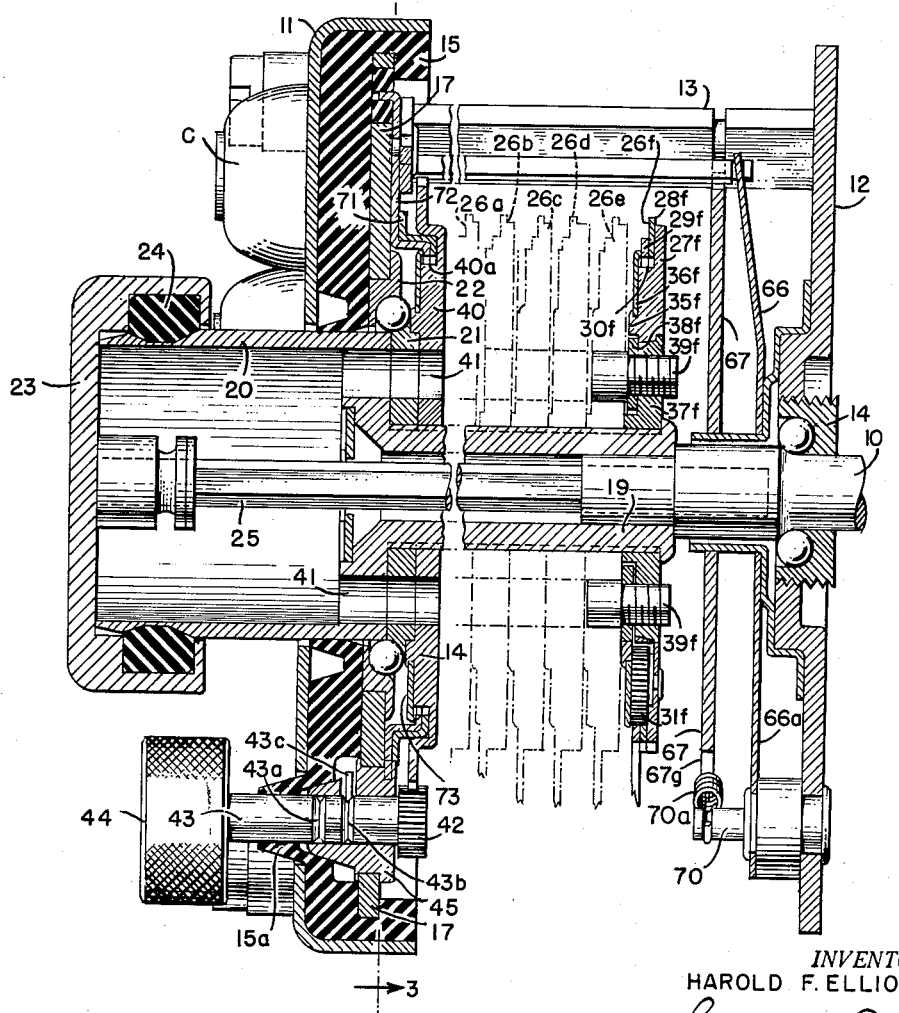
Fig. 2 is a longitudinal sectional view of the apparatus along the line 2—2 of Fig. 1.
Figure 3:
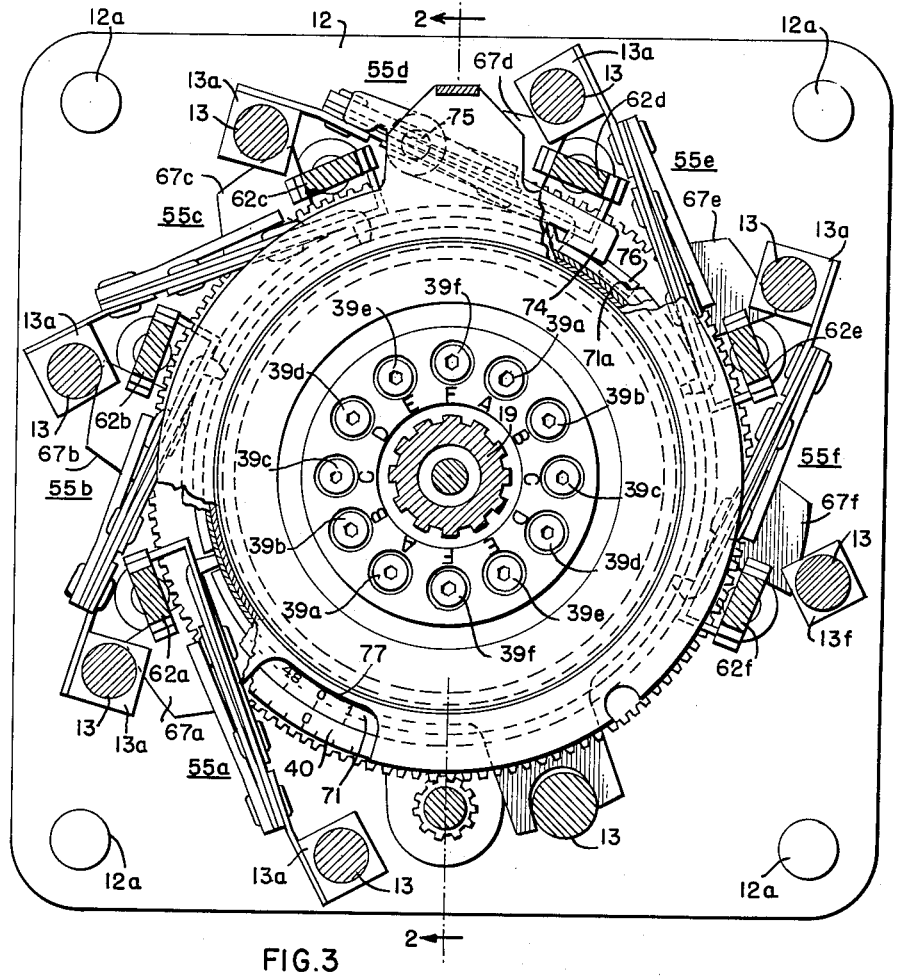
Fig. 3 is a front elevation of the apparatus of Fig. 1, partly in section, with the front cover removed.

Referring now more particularly to Figs. 1, 2, and 3 of the drawings, there is illustrated an apparatus for selectively and precisely positioning a driven element, such as a shaft 10 connected to the tuning element of a portable transceiver, in any of a plurality of predetermined angular positions and incorporating one embodiment of the present invention. This apparatus comprises a frame including a substantially square top plate 17 and a bottom plate 12 interconnected by a series of posts 13 which, with the plates 17 and 12, form a rigid frame assembly. The shaft 10 is pivotally mounted in the frame by means of suitable antifriction bearings 14. The apparatus also includes a substantially square cup-shaped cover plate 11 and a molded plastic member 15 disposed adjacent the inner surface of the cover plate 11 and serving to form a waterproof barrier separating the front of the apparatus from the interior. To this end, the cover plate 11 is apertured at each corner, as at 11a, to receive a molded plastic grommet 18 through which passes machine screw or bolt 16 engaging the top plate 17 and serving to clamp the molded member 15 between the top plate 17 and cover 11 (Fig. 4). The cover plate 11 may be extended and serve as a means for securing the positioning apparatus to the transceiver or other apparatus to be controlled and, as shown, the bottom plate 12 may be provided with a series of holes 12a for connecting the positioning apparatus with the apparatus to be controlled.

The positioning apparatus of the invention includes means for actuating the shaft 10, which may be in the form of a splined sleeve or shaft 19 secured to and forming an extension of shaft 10 and having an enlarged hub 20. To the inner face of the hub 20 may be secured a ring 21 forming one element of an anti-friction bearing, the other element being a ring 22 secured to the plate 17 and retaining the conventional ball bearings 14 therebetween. On the outer end of the hub 20 is a knurled operating knob 23 secured in place by a resilient molded plastic ring 24 which also provides a waterproof joint between the knob 23 and the interior of hub 20. If desired, an Allen-head wrench 25 for setting the tuning apparatus, as described hereinafter, may be retained within the hub 20 and the recess of the sleeve 19.

The tuning apparatus of the invention includes a plurality of detent assemblies 26a–26f, inclusive, disposed along the sleeve or shaft 19. The apparatus of Figs. 1, 2, and 3 is of the multi-revolution type providing a high degree of precision over a multi-revolution range of adjustment of shaft 10. In this type of apparatus, each of the detent assemblies includes a fast detent disc rotatable over a multi-revolution range and a slow detent disc rotatable over approximately a single-revolution and a speed reduction gearing interconnecting these discs. An exploded perspective view of one of these assemblies, for example, assembly 26f, is shown in Fig. 6, comprising a fast detent disc 27f, a slow detent disc 28f, and a stator ring 29f. The disc 27f is provided with a hub 30f on which the internally toothed disc 28f and stator 29f are journalled. The disc 27f also carries a sun gear 31f meshing with the internal teeth of discs 28f and 29f, while these elements have slightly unequal numbers of internal teeth so that the elements described form a conventional planetary gearing. The fast detent disc 27f is provided with a detent notch 32f, while the slow detent disc 28f is provided with a detent notch 33f and the diameter of the disc 28f is somewhat greater than that of the fast disc 27f so that the latch co-operating therewith, described hereinafter, does not interfere with the rotation of the disc 27f so long as it rides on the disc 28f. The stator 29f carries a notched projection 34f engaging one of the posts 13 to restrain it from rotation. As shown in Fig. 2, the disc 27f is provided with a shoulder 35f which carries, and is staked over to secure, a clamping ring 36f. It will be understood that each of the detent assemblies 26a–26f, inclusive, is similar in construction to that of the assembly 26f just described.

The positioning apparatus of the invention also includes releasable means for individually securing the detent assemblies to the shaft or sleeve 19 in positions related to the positions in which the driven shaft 10 is to be positioned. For example, the securing means for the detent assembly 26f comprises a hub 37f mounted on the shaft 19 and secured against rotation with respect thereto, as by having internal splines complementary to the splining of the shaft 19. As shown in Fig. 2, the outer periphery of the hub 37f is slightly tapered complementary to a tapering of the internal surface of the disc 27f. There is provided an axially adjustable ring 38f having a series of holes around its periphery in alignment with a similar series of threaded holes around the periphery of the hub 37f. A pair of locking screws 39f, 39f disposed in diametrically opposite holes in the ring 38f and hub 37f serve to lock the disc 27f to the hub 37f at a plurality of angularly symmetrically spaced points, specifically, at diametrically opposite points.

Thus, the fast detent disc of each of the detent assemblies 26a–26f, inclusive, is locked to its associated hub by a pair of diametrically disposed locking screws and a clamping ring. As shown in Fig. 3, in which the screws are identified by their respective letters, the screws for the several detent assemblies are progressively displaced one hole from assembly to assembly. The hub 20, the bearing member 21, and a gear member 40 (to be described hereinafter) are also provided with a series of aligned holes 41 to permit access of the Allen-head wrench 25 to each of the pairs of locking screws, such as the screws 39f, for releasing the same during initial adjustment of the apparatus and locking the detent assemblies in their respective adjusted positions.

The positioning apparatus of the invention also includes auxiliary means for locking the shaft 19, and thus the shaft 10, to the frame while adjusting and setting the means for securing the detent assemblies to the shaft. This auxiliary means includes the vernier positioning element or gear 40 secured to the shaft 19 and a clamp for locking the positioning element 40 to the frame while setting the securing means. As shown in Fig. 2, the gear 40 is engageable with a pinion 42 disposed on a shaft 43 axially slidable with respect to the frame and having a manually operable knob 44. The shaft 43 is disposed in a sleeve bearing 45 mounted in the frame member 17, while the molded member 15 has a cup-like extension 15a closely fitting the shaft 43 and providing a watertight seal about the same. The shaft 43 is provided with spaced peripheral detent grooves 43a and 43b and a detent spring 43c for restraining it in its operative and inoperative positions, respectively.

The clamping mechanism is shown in detail in Fig. 5 and includes a clamping nut 46 engaging an Allen-head locking screw 51 and mounted on a leaf spring 47 secured to a pair of posts 48 (Fig. 1). In order to prevent warping of the gear 40 or the clamping mechanism, a pair of rest pins 49 and 50 are disposed in the frame member 17 so that, as the nut 46 is tightened, the outer face of the pin 50 is the same distance from the plate 17 as the face of the gear 40 when resting against the pin 49. A cup-shaped formation 15b in the molded member 15 serves to form a watertight seal about the head of the screw 51.

The positioning apparatus of the invention also includes a plurality of selectively operable latches individually co-operating with the detent assemblies and arranged in overlapping relation in an arc about the shaft 19 and substantially tangential to the detent discs of the detent assemblies. This overlapping tangential constructions results in an apparatus of minimum overall dimensions for detent assemblies of any given diameter. Referring to Figs. 3, 8, and 9, it will be seen that the latches 55a–55f, inclusive, are arranged, as described, for co-operation with the detent assemblies 26a–26f, inclusive, respectively. One of the detent assemblies, for example, detent assembly 55f, is shown in its unlatched and latched positions in Figs. 8 and 9, respectively.

Figure 3A:
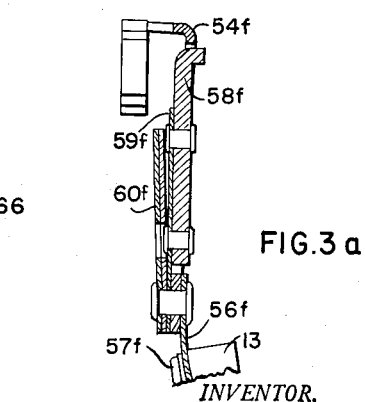
Fig. 3a is a cross-sectional detail of one of the latches, for example, the latch 55f.

The latch 55f comprises a spring hinge 56f secured to the frame, specifically, to one of the posts 13 of the frame, by a series of machine screws 57f, or equivalent. The latch also comprises a rigid gating element 54f riveted or otherwise secured to the spring hinge 56f and having a window in which is disposed a latching element 58f mounted on the hinge 59f and spring-biased by springs 60f with respect to the gating element 54f toward engagement with its associated detent discs 27f and 28f and engageable with the detents thereof to arrest the shaft 19 and the shaft 10, but normally out of contact with the discs, as shown in Fig. 8. Referring also to Fig. 3a specifically, the latching element 58f is mounted on a leaf spring 59f, while one or more overlying leaf springs 60f engage the head of one of the rivets securing the latching element 58f to the leaf spring 59f and thus bias the latching element into engaging position, placing it under an initial tension. The use of spring hinges in the latch assemblies lowers their cost relative to pivoted elements and eliminates all lost motion, permitting the use of elements of moderate manufacturing tolerance, while initially tensioning the latching element 58f ensures firm and positive engagement and disengagement with its associated detent discs.

As shown in Fig. 10, which represents a development of the latches, the latching elements 58a–58f, inclusive, are axially offset from latch to latch by the distance separating adjacent detent assemblies 26a–26f, inclusive. In order to minimize the number of different component parts to be fabricated, only three different gating elements 54 are provided, each with a window twice the width of the latch head of the latching elements 58. With this arrangement, only two different latching elements are required, one with a right-hand latch head and one with a left-hand latch head, while only two series of leaf spring elements, 59 and 60, are required for all of the latches.

The positioning apparatus of the invention also includes a plurality of selectively operable devices for individually setting any one of the latches for engagement with a corresponding one of the detent assemblies, upon operation to arrest the driven element or shaft 10 in a corresponding one of its predetermined positions. These selectively operable actuating devices may be in the form of a plurality of manually operable push buttons and push rods arranged in an arc about the shaft 19, parallel to the axis of the detent disc assemblies, and movable axially for individually setting the latches. For example, in Figs. 8 and 9 there is shown a push rod 62f manually operable by a push button F which is formed as a part of the molded waterproofing member 15 and provided with a recess 63f proportioned to receive the upper end of the push rod 62f. The upper end of the push rod 62f is of reduced section and slides in a positioning slot 17f of frame plate 17. The push rod 62f has a notch 64f normally receiving an upstanding lug 65f of gating element 54f. The push rod 62f is biased into its unlatched position by a spider spring 66 (Fig. 7), each of the arms of which is apertured to engage a reduced end portion of one of the push rods 62a–62f, inclusive. The spider also has an anchor arm 66a which is staked to a post 70 secured to the frame plate 12.

The positioning apparatus of the invention also includes a latch plate 67 (Fig. 2) pivoted about the shaft 10 and biased into engagement with each of the push rods 62a–62f, inclusive, for holding the same when depressed and releasing any other push rod which may have been depressed previously. The latch plate 67 has a plurality of radially extending ears 67a–67f, inclusive. The push rod 62f is provided with a notch 68f disposed, upon depression of the push rod, to engage ear 67f of the latch plate, as shown in Fig. 9. Ahead of the notch 68f of push rod 62f is an ear 69f which, upon depression of the pushrod, is effective to cam the latch plate for counterclockwise rotation to release any other push rod that may have been depressed previously. A biasing spring 70a engages an ear 67g of the latch plate 67 and a fixed point of the frame, such as post 70 (Fig. 2), for biasing the latch plate into engagement with the several push rods 62a–62f, inclusive. As shown in Figs. 8 and 9, the push button F, when its associated latch is unlatched, is fully extended, while it is retracted when its latch is in the latched position shown in Fig. 9. Preferably, the molded member 15 is formed with the push buttons A–F, inclusive, initially retracted as shown in Fig. 9, so that the natural resilience of the molded member is effective to maintain the push button portions in engagement with their respective push rods without the necessity of any additional securing elements. As shown in Figs. 3 and 8, each of the posts 13 is provided with a peripheral slot 13a engaging and supporting one of the ears 67a–67f, inclusive, of the latch plate 67. Thus, these posts serve three functions: they act as posts tying together the frame plates 12 and 17 into a rigid frame; they serve as supports for the latch assemblies 55a–55f, inclusive; and they provide supports for the ears of latch plate 67.

The positioning apparatus of the invention also includes provisions for stopping rotation of the knob 23 and the detent assemblies driven thereby at a limiting position for either direction of rotation, corresponding to a limiting position of the driven shaft 10. This stop mechanism includes the gear element 40 (Fig. 2) which is splined or otherwise secured to the shaft 19 and constitutes a fast rotating element corresponding to the elements 27a–27f, inclusive, of the detent assemblies. The element 40 has a shoulder 40a on which are journalled a slow rotating member 71 and a stator 72. These elements have internal teeth corresponding to those of the slow rotating member 28f and the stator member 29f of the detent assembly 26f. The fast rotating member 40 carries a sun gear (not shown) corresponding to the sun gear 31f of the detent assembly 26f, while a clamping ring 73 staked to a shoulder of the gear member 40 retains the elements 71 and 72 in proper relation to the gear member 40. The rim of the slow member 71 has a cam notch 71a (Fig. 3) co-operating with a pawl 74 pivoted on a post 75 of the frame and spring-biased into engagement with the disc 71. The gear member 40 comprising the fast rotating member of this planetary gear system carries a stop 76 so that, when the pawl 74 drops into the notch 71a of the slow rotating member 71, it engages the stop 76 to limit the rotation of the knob 23 and detent assemblies.

The positioning apparatus of the invention also includes means for giving a continuous visual indication of the revolution in which the knob 23 is moving, as well as the point in the revolution. To this end, the slow member 71 is provided with a dial scale on its periphery calibrated in terms of the number of revolutions of the fast member, while the fast member 40 has a degree scale on its outer periphery adjacent the periphery of the slow member 71. A window 77 (Figs. 1 and 3) in the top plate 17, plastic member 15, and cover 11, preferably sealed for waterproofing, exposes a portion of the scales on the members 40 and 71 to view. With this arrangement, when operating the positioning apparatus under conditions which favor visual tuning, the operator can minimize the required movement of the actuating knob 23 to reach a desired position of the shaft 10 by noting from the scales on the elements 40 and 71 the point in the range of rotation of the knob 23 then occupied by the apparatus. These scales also facilitate the process of initially setting the detent assemblies for the desired channels.

It is believed that the operation of the precision positioning apparatus of the invention will be clear from the foregoing description. However, such operation will be briefly described by reference to the steps of initially setting the apparatus to the desired positions and the subsequent selection of any preset position. In setting up the apparatus to position the shaft 10 corresponding to a desired channel of a connected transceiver, for example, a given push button, for example, the push button F, is depressed as shown in Fig. 9, bringing the latching element 58f into engagement with its associated slow detent disc 28f. Because of the larger diameter of this disc, the latching element does not engage the fast detent disc 27f until it registers with the detent 33f of the disc 28f. The manually operable knob 23 is then rotated until the latching element 58f engages both of the detents 32f and 33f of the detent discs 27f and 28f, respectively. Because of the planetary gearing interconnecting these discs, as described, this may represent a relatively large number of revolutions of the knob 23. For example, if the detent disc 28f is provided with sixty internal teeth and the stator 29f with fifty-nine internal teeth, the knob 23 and its associated fast detent disc 27f may make sixty revolutions for one revolution of the slow detent disc 28f. Obviously, if the detent 33f of the slow disc is initially at some intermediate position, the knob 23 need be rotated only through a corresponding fraction of the sixty revolutions.

When the latching element 58f has engaged the detents of both detent discs 27f and 28f, the two clamping screws 39f, 39f are released and the tuning knob 23 is rotated to tune the connected transceiver to the desired station. Precise tuning is aided by pulling out the knob 44 to engage the pinion 42 with the vernier tuning gear 40. When the transceiver is precisely tuned, the locking screw 51 is tightened to cause the nut 46 to clamp the rim of the vernier gear 40 firmly against the resting pin 49, thus locking the tuning mechanism to the frame.

With the shaft and its connected elements thus held against angular displacement, the two clamping screws 39f, 39f are firmly tightened to clamp the associated detent assembly 26f to its respective hub 37f at diametrically opposed points. The locking screw 51 is then released and the operation repeated for each of the other push buttons A–E, inclusive, in order to set the driven shaft 10 to each of its desired positions. By locking each of the detent assemblies to its respective hub at two or more angularly displaced points, relative pivotal movement about a single locking point is eliminated, in spite of repeated jars resulting from operation of the latching mechanism. The requirement of a precision concentric joint between the detent assemblies and their respective hub is obviated, since it is necessary only that these elements retain precisely their relative positions in which they are set during initial adjustment of the apparatus.

When the positioning apparatus has been originally set, as described, and it is desired to operate it to adjust the shaft 10 to one of its predetermined positions corresponding, for example, to a particular channel of a connected transceiver, one of the push buttons, for example, the push button F, is operated from the position shown in Fig. 8 to that shown in Fig. 9. Movement of the push rod 62f axially of the array of detent assemblies 26a–26f, inclusive, is effective to cam upstanding ears 65f of the gating element 61f out of the notch 64f and to depress the gating element 61f so that its associated latching element 58f is biased into engagement with its associated detent discs 27f and 28f. In the event that any one of the other push buttons A–E, inclusive, has previously been depressed, movement of the push rod 62f cams the arm 67f of the latching plate 67 into counterclockwise rotation (as viewed in Figs. 8 and 9), thereby releasing any other push rod which may have been depressed. Further depression of the push rod 62f permits the latching plate 67 to be rotated clockwise under the influence of its biasing spring 69 so that its arm 67f is engaged in the notch 68f of the push rod, latching it in its depressed position.

When the push button F of the positioning apparatus has been set as thus described, rotation of the knob 23 in the direction to bring the detent 32f of the slow detent disc 28f toward the latch member 58f will cause the latch element 58f to engage the detent of the slow detent disc 28f first and finally that of the fast detent disc 27f precisely to position the driven shaft 10 and to lock the apparatus in that position. In the event that the knob 23 should initially be rotated in the wrong direction, rotation will continue until the stationary pawl 74 engages the notch 71a in slow disc 71 and the stop 76 on the gear 40, whereupon the operator reverses the rotation of knob 23 and continues until the latch 58f engages its detent assembly as described above.

Thus operation of the apparatus in the dark, or under other conditions where visual tuning is impracticable, can readily be accomplished by the operator. By a simple feeling operation, the operator can determine the push button corresponding to the channel to which he wishes to tune his communication apparatus and depress the button as described. He then turns the knob 23 in either direction until rotation is stopped and then attempts to rotate it in the opposite direction. If rotation is stopped by proper engagement of a latch element with a detent disc, rotation in the opposite direction will be impossible. If rotation is initially stopped by engagement of the pawl 74 with the stop 76, then the knob 23 can be rotated in the opposite direction until the detent mechanism is engaged as described. When the apparatus is finally positioned by such engagement of the detent mechanism, the knob 23 is positively locked against further rotation in either direction and the operator knows that his apparatus has positioned the shaft 10 and its associated tuning element for reception or transmission on the desired channel.

Referring now to Fig. 11, there is represented in longitudinal section a modified form of precision positioning apparatus embodying the invention. This form of the invention is similar in principle to that represented by Figs. 1, 2, and 3 with the exceptions that it is designed for single-revolution operation, so that the planetary gearing of the detent assemblies is omitted, and that the apparatus is given a cantilever support on an extension of the shaft to be positioned. This latter feature eliminates the necessity of bearings between the apparatus and its frame and minimizes the possibility of binding due to misalignment of such bearings with the bearings of the apparatus being controlled. In Fig. 11 elements corresponding to those of Figs. 1, 2, and 3 are identified by corresponding reference numerals, while those performing analogous functions are identified by the same reference numerals increased by 100. In the apparatus of Fig. 11, the shaft 110 to be positioned extends from a frame 80 of the apparatus to be positioned, the details of which are omitted since they constitute no part of the present invention. In this case, the hub 120 is formed with a thick radial flange 120a which is secured to the shaft 110 by a set screw 81. The hubs 137a–137f, inclusive, of the detent assemblies are secured to the flange 120a by a series of cap screws 82. In this embodiment, the detent assembly of the apparatus of Figs. 1, 2, and 3, comprising the fast detent disc 27a, the slow detent disc 28a, and the stator 29a, is replaced by single detent discs 127a–127f, inclusive. The arrangement for releasably securing the detent discs 127a–127f, inclusive, to their respective hubs 137a–137f, inclusive, is the same as in the apparatus of Figs. 1, 2, and 3. In this arrangement also, the planetary gearing system associated with the gear 40 is eliminated and the gear 40 replaced by a simple gear 140. The arrangement of the latch assemblies is the same as that in the apparatus of Figs. 1, 2, and 3.

The operation of the positioning apparatus of Fig. 11 is similar to that of Figs. 1, 2, and 3 except that the range of rotation of the knob 23 and its associated detent assemblies is limited to something less than one revolution. Simple co-operating stop members on the gear 140 and the frame (not shown) limit the range of rotation to the desired angle. As pointed out above, the fact that the positioning apparatus is supported solely from the shaft 110 substantially eliminates problems of alignment of any bearings in the apparatus with those of the controlled apparatus.

In some applications of the positioning apparatus of the invention, it may be desired to give a "sense of direction" to the rotation of the actuating knob 23 by the operator, to enable the operator to adjust the mechanism directly to the preselected position without an initial false rotation in the opposite direction to the stop and then reverse rotation to the preselected position. This may be accomplished by constructing each of the detent assemblies, in the case of the apparatus of Figs. 1, 2, and 3, or each of the detent discs, in the case of apparatus of the type of Fig. 11, with a series of oppositely directed ratchet teeth on either side of its detent and providing a pawl co-operating with the ratchet discs to prevent movement of the discs in a direction away from the detent notches, thereby to effect direct homing of the driven shaft 10 to a selected position. One such detent assembly of the multi-revolution type is illustrated in Fig. 12, it being understood that a plurality of such detent assemblies will be provided one for each position of the shaft 10 to be selected. The detent assembly of Fig. 12 includes a fast detent element 227 having a detent notch 227a and two series of oppositely directed ratchet teeth 227b and 227c, the teeth sloping oppositely on opposite sides of the detent 227a. The detent assembly also includes a slow detent disc 228 having a detent 228a and two series of ratchet teeth 228b and 228c sloping in opposite directions on either side of the detent notch 228a. It will be understood that the planetary gearing interconnecting the discs 227 and 228 may be like that of Fig. 6.

In the construction of Fig. 12, the latch element 258 of the latch assembly 255 co-operates not only with the detent notches 227a and 228a, as in the apparatus of Figs. 1, 2, and 3, but also with the ratchet teeth of the detent discs 227 and 228. In operation, if the operator attempts to rotate the knob 23 in a direction such as to increase the distance between the latch of the selected push button and the detent of the slow or fast disc 228, 227, respectively, the latch 258 will engage the ratchet teeth, first of the slow disc 228 and then of the fast disc 227, to prevent rotation in that direction. With such an arrangement then, the knob 23 can only be adjusted in a direction towards the preselected position, thus providing direct homing. The detent assembly of Fig. 12 is particularly advantageous in the multi-revolution type of positioning apparatus of Figs. 1, 2, and 3 and eliminates the possibility of turning the knob 23 many revolutions in the wrong direction. However, if desired, it can also be embodied in the single-revolution apparatus of Fig. 11 by utilizing only the fast detent discs with oppositely directed sets of ratchet teeth and eliminating the slow discs and interconnecting planetary gearing.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An apparatus for selectively and precisely positioning a driven element in any of n predetermined angular positions comprising: a shaft for connection to said driven element; means for actuating said shaft; n circular discs axially disposed along said shaft, each having a detent; releasable means for individually securing said discs to said shaft in positions related to said predetermined positions; n selectively operable latches individually co-operating with said discs and arranged in an arc about said shaft, each engageable with the detent of its associated disc to arrest said shaft but normally out of contact with said disc; and n manually operable push buttons arranged in an arc about said shaft and movable axially with respect thereto for individually setting any one of said latches for engagement with a corresponding one of said disc detents upon operation of said actuating means to arrest said driven element in a corresponding one of said predetermined positions.

2. An apparatus for selectively and precisely positioning a driven element in any of n predetermined angular positions comprising: a shaft for connection to said driven element; means for actuating said shaft; n circular discs axially disposed along said shaft, each having a detent; releasable means for individually securing said discs to said shaft in positions related to said predetermined positions; n selectively operable latches individually cooperating with said discs and arranged in overlapping relation in an arc about said shaft and substantially tangential to said discs, each engageable with the detent of its associated disc to arrest said shaft but normally out of contact with said disc; and n selectively operable devices movable axially with respect to said shaft for individually setting any one of said latches for engagement with a corresponding one of said disc detents upon operation of said actuating means to arrest said driven element in a corresponding one of said predetermined positions.

3. An apparatus for selectively and precisely positioning a driven element in any of the n predetermined angular positions comprising: a shaft for connection to said driven element; means for actuating said shaft; n circular discs axially disposed along said shaft, each having a detent; releasable means for individually securing said discs to said shaft in positions related to said predetermined positions; n selectively operable latches individually co-operating with said discs and arranged in overlapping relation in an arc about said shaft and substantially tangential to said discs, each of said latches comprising a spring hinge and a latching element mounted on said hinge spring-biased with respect thereto toward engagement with its associated disc and engageable with the detent of its associated disc to arrest said shaft but normally out of contact with said disc; and n selectively operable devices movable axially with respect to said shaft for individually setting any one of said latches for engagement with a corresponding one of said disc detents upon operation of said actuating means to arrest said driven element in a corresponding one of said predetermined positions.

4. An apparatus for selectively and precisely positioning a driven element in any of n predetermined angular positions comprising: a frame; a shaft for connection to said driven element and pivotally mounted in said frame; means for actuating said shaft; n circular discs axially disposed along said shaft, each having a detent; releasable means for individually securing said discs to said shaft in positions related to said predetermined positions; n selectively operable latches individually co-operating with said discs and arranged in overlapping relation in an arc about said shaft and substantially tangential to said discs, each of said latches comprising a spring hinge secured to said frame and a latching element engageable with the detent of its associated disc to arrest said shaft but normally out of contact with said disc; and n selectively operable devices movable axially with respect to said shaft for individually setting any one of said latches for engagement with a corresponding one of said disc detents upon operation of said actuating means to arrest said driven element in a corresponding one of said predetermined positions.

5. An apparatus for selectively and precisely positioning a driven element in any of n predetermined angular positions comprising: a shaft for connection to said driven element; means for actuating said shaft; n circular discs axially disposed along said shaft, each having a detent; means for individually securing said discs to said shaft in positions related to said predetermined positions, each of said securing means including a hub mounted on said shaft and secured against rotation with respect thereto, an axially adjustable ring for clamping an associated disc to said hub, and means for locking said ring to said hub at a plurality of angularly symmetrically spaced points; n selectively operable latches individually co-operating with said discs, each engageable with the detent of its associated disc to arrest said shaft but normally out of contact with said disc; and n selectively operable devices movable axially with respect to said shaft for individually setting any one of said latches for engagement with a corresponding one of said disc detents upon operation of said actuating means to arrest said driven element in a corresponding one of said predetermined positions.

6. An apparatus for selectively and precisely positioning a driven element in any of n predetermined angular positions comprising: a shaft for connection to said driven element; means for actuating said shaft; n circular discs axially disposed along said shaft, each having a detent; releasable means for individually securing said discs to said shaft in positions related to said predetermined positions; n selectively operable latches individually co-operating with said discs and arranged in overlapping relation in an arc about said shaft and substantially tangential to said discs, each engageable with the detent of its associated disc to arrest said shaft but normally out of contact with said disc; and n selectively manually operable push rods arranged in an arc about said shaft and parallel to the axis of said discs and movable axially for individually setting any one of said latches for engagement with a corresponding one of said disc detents upon operation of said actuating means to arrest said driven element in a corresponding one of said predetermined positions.

7. An apparatus for selectively and precisely positioning a driven element in any of n predetermined angular positions comprising: a shaft for connection to said driven element; means for actuating said shaft; n circular discs axially disposed along said shaft, each having a detent; releasable means for individually securing said discs to said shaft in positions related to said predetermined positions; n selectively operable latches individually co-operating with said discs and arranged in overlapping relation about said shaft and substantially tangential to said discs, each engageable with the detent of its associated disc to arrest said shaft but normally out of contact with said disc; n selectively manually operable push rods parallel to the axis of said discs and movable axially for individually setting any one of said latches for engagement with a corresponding one of said disc detents upon operation of said actuating means to arrest said driven element in a corresponding one of said predetermined positions; and a latch plate pivoted about said shaft and biased into engagement with each of said push rods for holding the same when depressed and releasing the others of said push rods.

8. An apparatus for selectively and precisely positioning a driven element in any of n predetermined angular positions comprising: a frame; a shaft for connection to said driven element and pivotally mounted in said frame; means for actuating said shaft; n circular discs axially disposed along said shaft, each having a detent; releasable means for individually securing said discs to said shaft in positions related to said predetermined positions; auxiliary means for locking said shaft to said frame while setting said securing means; n selectively operable latches individually co-operating with said discs, each engageable with the detent of its associated disc to arrest said shaft but normally out of contact with said disc; and n selectively operable devices for individually setting any one of said latches for engagement with a corresponding one of said disc detents upon operation of said actuating means to arrest said driven element in a corresponding one of said predetermined positions.

9. An apparatus for selectively and precisely positioning a driven element in any of n predetermined angular positions comprising: a frame; a shaft for connection to said driven element; means for actuating said shaft; n circular discs axially disposed along said shaft, each having a detent; releasable means for individually securing said discs to said shaft in positions related to said predetermined positions; a vernier positioning element secured to said shaft; a clamp for locking said positioning element to said frame while setting said securing means; n selectively operable latches individually co-operating with said discs, each engageable with the detent of its associated disc to arrest said shaft but normally out of contact with said disc; and n selectively operable devices for individually setting any one of said latches for engagement with a corresponding one of said disc detents upon operation of said actuating means to arrest said driven element in a corresponding one of said predetermined positions.

10. An apparatus for selectively and precisely positioning a driven element in any of n predetermined angular positions comprising: a shaft for connection to said driven element; means for actuating said shaft; n detent assemblies disposed along said shaft, each including a fast detent disc rotatable over a multi-revolution range, a slow detent disc, and a speed reduction gearing interconnecting said discs, said slow detent disc having a diameter greater than that of said fast detent disc; releasable means for individually securing said detent assemblies to said shaft in positions related to said predetermined positions; n selectively operable latches individually cooperating with said detent assemblies, each engageable with the detents of its associated detent assembly to arrest said shaft but normally out of contact with said detent assembly; and n selectively operable devices for individually setting any one of said latches for engagement with a corresponding one of said detent assemblies upon operation of said actuating means to arrest said driven element in a corresponding one of said predetermined positions.

11. An apparatus for selectively and precisely positioning a driven element in any of n predetermined angular positions comprising: a shaft for connection to said driven element; means for actuating said shaft; n circular discs disposed along said shaft, each having a detent and a series of oppositely directed ratchet teeth on either side of said detent; releasable means for individually securing said discs to said shaft in positions related to said predetermined positions; n selectively operable latches individually co-operating with said discs, each engageable with the detent of its associated disc to arrest said shaft but normally out of contact with said detent assembly; n selectively operable devices for individually setting any one of said latches for engagement with a corresponding one of said disc detents upon operation of said actuating means to arrest said driven element in a corresponding one of said predetermined positions; and a pawl co-operating with each of said ratchet discs to effect direct homing of the driven element to a selected position.

12. An apparatus for selectively and precisely positioning a driven element in any of n predetermined angular positions comprising: a shaft for connection to said driven element; means for actuating said shaft; n detent assemblies disposed along said shaft, each including a fast detent disc rotatable over a multi-revolution range, a slow detent disc, and speed reduction gearing interconnecting said discs, each of said detent discs having a series of oppositely directed ratchet teeth on either side of its respective detent and said slow detent disc having a root diameter greater than the tooth diameter of said fast disc; releasable means for individually securing said detent assemblies to said shaft in positions related to said predetermined positions; n selectively operable latches individually co-operating with said detent assemblies, each engageable with the detents of its associated detent assembly to arrest said shaft but normally out of contact with said detent assembly; n selectively operable devices for individually setting any one of said latches for engagement with a corresponding one of said detent assemblies upon operation of said actuating means to arrest said driven element in a corresponding one of said predetermined positions; and a pawl co-operating with said ratchet discs to effect direct homing of the driven element to a selected position.

References Cited in the file of this patent

UNITED STATES PATENTS

| | | |
|---|---|---|
| 2,067,992 | Thomas | Jan. 19, 1937 |
| 2,393,591 | Cramer | Jan. 29, 1946 |